United States Patent

[11] 3,586,986

[72] Inventors Jean Victor Martens Deurne-Zuid; Marcel Clement Rene Natens, Antwerpen, both of, Belgium
[21] Appl. No. 800,434
[22] Filed Feb. 19, 1969
[45] Patented June 22, 1971
[73] Assignee International Standard Electric Corporation New York, N.Y.
[32] Priority Mar. 12, 1968
[33] Netherlands
[31] 6803475

[54] FREQUENCY DISCRIMINATOR
7 Claims, 6 Drawing Figs.

[52] U.S. Cl. 329/103, 307/233, 329/129, 329/140
[51] Int. Cl. H03d 3/26
[50] Field of Search 329/103, 116, 117, 119, 129, 130, 140—143; 307/233

[56] References Cited
UNITED STATES PATENTS

| | | | |
|---|---|---|---|
| 2,601,340 | 6/1952 | Staehura | 329/140 |
| 2,876,346 | 3/1959 | Engstrom | 329/140 X |
| 3,108,230 | 10/1963 | Hurtig | 307/233 X |
| 3,204,190 | 8/1965 | Broadhead | 329/103 X |
| 3,292,093 | 12/1966 | Clarke et al. | 329/129 |
| 3,428,906 | 2/1969 | Pozzetti | 329/116 X |

*Primary Examiner*—Alfred L. Brody
*Attorneys*—C. Cornell Remsen, Jr., Walter J. Baum, Percy P. Lantzy, Philip M. Bolton, Isidore Togut and Charles L. Johnson, Jr.

ABSTRACT: A frequency selective network is coupled to an input signal source and two output detecting circuits to produce the desired output signal. The selective network is coupled in parallel with the source and includes a two terminal reactive network exhibiting at least one reversal of sign at a predetermined frequency in series with a two terminal resistive network. One of the detecting circuits includes a unity gain transistor amplifier coupled to be responsive to the voltage across the reactive network, and a first output transistor coupled to the output of the amplifier. The other of the detecting circuits includes a second output transistor coupled to be responsive to the voltage across the resistive network. The first output transistor is of a conductivity type opposite to the conductivity type of the second output transistor and the transistor of the amplifier and the collectors of the first and second output transistors are connected directly together to provide the desired output signal.

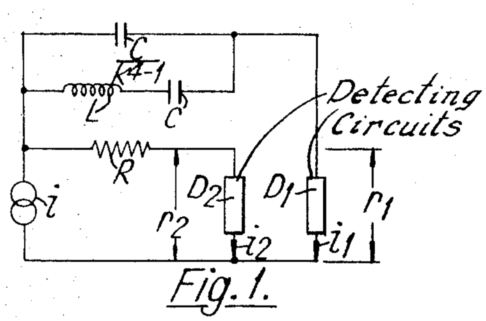
Fig. 1.
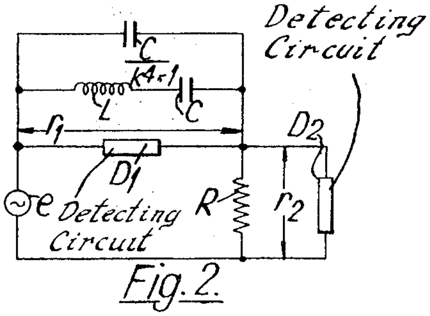
Fig. 2.
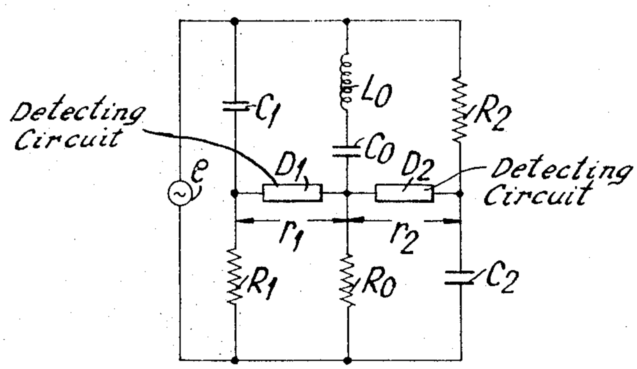
Fig. 3.
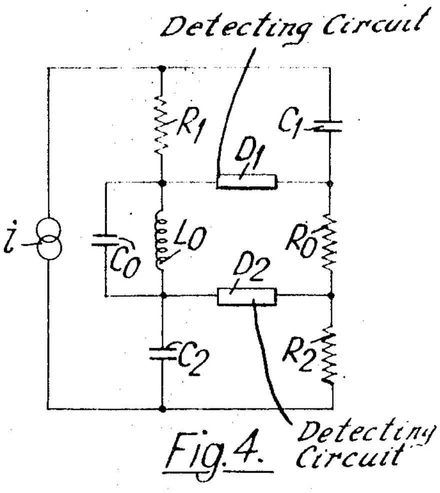
Inventors
JEAN V. MARTENS
MARCEL C. R. NATENS
By Alfred C. Hill
Agent Inventors
JEAN V. MARTENS
MARCEL C. R. NATENS
By Alfred C. Hill
Agent

FREQUENCY DISCRIMINATOR

BACKGROUND OF THE INVENTION

The invention relates to angle modulation detectors including a frequency selective network fed by a source of input signals and provided with two output detecting circuits adapted to produce an output signal representing the difference between the magnitudes of the respective output signals from said network which includes a first essentially reactive two-terminal network exhibiting at least one reversal of sign at a predetermined frequency and a second two-terminal network, said networks being coupled to said detecting circuits.

Such an angle modulation detector has been disclosed, for instance, in U.S. Pat. No. 2,712,600, and with this known arrangement, the first reactive network is essentially constituted by a crystal while the second network is mainly made up of a capacitance.

In accordance with well established terminology, angle modulation detectors refer to those arrangements able to detect FM (frequency modulation) or PM (phase modulation), or hybrid forms of FM and PM. Such angle modulation detectors and more particularly frequency discriminators have become well known with the advent of FM transmission. Three broad types of frequency discriminators are now classical and have found wide use. The Foster-Seeley discriminator has been described, for instance, in the Proceedings of the IRE, Vol. 25, Page 289, 1937, "Automatic Tuning, Simplified circuit, and Design Practice," by D. E. Foster and S. W. Seeley. In common with other arrangements, its underlying principle consists in rectifying two signals derived from the input signal and whose relative amplitudes are a function of frequency. By combining the two rectified voltages to secure the difference, this output signal can be made a function of the instantaneous frequency of the applied input signal. If a balanced frequency discriminator is used, the output voltage characteristic passes through zero when the input signal is at its nominal center frequency and linear output deviations on both sides of zero value can be obtained for the output voltage in function of the instantaneous input frequency, at least over a predetermined range of frequency. The Foster-Seeley frequency discriminator is a balanced arrangement of this type and the two frequency dependent voltages are obtained by means of a basic arrangement consisting in a primary coil inductively coupled to a secondary coil having a midpoint tapping connected directly, or by means of a capacitor, to one end of the primary coil. Both are tuned by capacitors and two frequency dependent voltages are those secured at the two ends of the secondary coil. Indeed, the voltages thereat consist in the voltage across the primary coil to which has been added vectorially the respective voltages across the two halves of the secondary coil. This means that when the input signal is at the center frequency to which the discriminator is tuned, the two voltages between the outer ends of the secondary coil and the tapping point will be in antiphase with one another and at 90° with respect to the voltage across the primary coil. Thus, the two voltages present at these outer ends are of equal magnitude so that the difference between the latter will be zero. As the frequency of the input signal varies, the two voltages across the two halves of the secondary coil will remain of equal magnitude and in antiphase, but their phase with respect to the primary voltage will depart from 90° so that this rotation will create a positive or negative difference between the magnitudes of the voltages at the outer ends of the secondary coil, which difference will, thus, be a measure of the deviation in frequency from the central value.

The Crosby discriminator which has been described in the RCA Review, Vol. 5, Pg. 89, 1940 "Reactance Tube Frequency Modulators," by M. G. Crosby, uses on the other hand an inductive arrangement involving a primary and two secondary coils which are intercoupled in various degrees. All three coils are also tuned, but this time while the primary coil is tuned to the center frequency, the two secondary coils are tuned, respectively, above and below the nominal value. These two secondary coils have a common point and the two frequency dependent voltages to be rectified are again obtained at the unconnected ends of these secondary coils.

A third well known frequency discriminator is the ratio detector which has been described in RCA Review, 1947, Pages 201—236, "The Ratio Detector," by S. W. Seeley and J. Avins. It appears extremely similar to the Foster-Seeley discriminator, but the two rectifiers are coupled to the two output points with reversed polarities as compared to the Foster-Seeley discriminator so that by linking the two diodes by an appropriate RC circuit, the sum of the two rectified output voltages can be kept substantially constant, at least within certain limits. This means that when using the difference between the two rectified voltages, to secure as before a measure of the frequency of the input signal, this difference between the two rectified voltages becomes solely a function of the ratio thereof. Indeed, the difference between two values can always be expressed in function of the sum of these values multiplied by a bilinear function of their ratio. In this light, it appears that the ratio detector, though it has generally been used in a form quite similar to that of the Foster-Seeley discriminator, is a principle of general application. By being substantially independent of amplitude modulation, not merely at the center frequency, but for other frequency values of the input signal, the arrangement has in principle the advantage of avoiding the use of an amplitude limiter before the frequency discriminator.

All three above well-known frequency discriminators, as well as many variations thereof, are essentially dependent on the use of relatively complicated inductive devices. Even if such inductive arrangements can be justified at the relatively high frequencies used in FM radio or TV (television) circuits where the couplings can easily be obtained between air core coils, they are certainly undesirable at lower frequency ranges where cores of magnetic material are then absolutely unavoidable and where the control of the coupling coefficients prohibits the use of tapping points and implies additional coils.

Naturally, the lower the frequency, the more bulky and costly will the coil be so that it is not surprising that efforts have already been expended in order to find alternative solutions for frequency discriminators.

An apparently ideal way would be to dispense with inductances altogether and this has been disclosed, for instance, in U.S. Pat. No. 3,086,175 covering an inductanceless FM discriminator using a pair of monolithic amplifiers tuned respectively above and below the center input frequency. Although such discriminators may be useful at high frequency where a high intrinsic range of frequency variation is nevertheless usually associated with a relatively narrow bandwidth of operation about the center frequency, they cannot be used at lower frequency, particularly in the case of multichannel VF (voice frequency) telegraphy in which carrier center frequencies of a few kc./s. are encountered, but where the relative bandwidths are considerable, e.g. a total frequency deviation of 120c./s.

Thus, a tuned circuit involving at least an inductance, or an equivalent device, still seems a desirable requirement for frequency discriminators, provided relatively complicated inductively coupled devices can be avoided, such as are found in the above described Foster-Seeley discriminator and ratio detector which usually involve also a tertiary winding. The different type of arrangement which is used in U.S. Pat. No. 2,712,600 mentioned at the beginning of this specification uses on the other hand a bridge circuit whose essential elements are constituted by a crystal and a capacitance located in adjacent branches or networks of the bridge, the other two branches or networks thereof being constituted by the detecting circuits. The equivalent impedance of a crystal corresponds essentially to a two-terminal reactance comprising one inductance and two capacitances with a high effective equivalent Q-factor. Considering an equivalent crystal network consisting of an inductance in series with a first capacitance, this series combination being shunted by the second capacitance, it is clear that this two-terminal reactive network is capacitive both at very low and very high frequencies, the reactance becoming inductive as the frequency increases from zero and reaches the series resonant frequency between the inductance and the first capacitance. As the frequency increases further, parallel resonance is achieved with the help of the second parallel capacitance and from then on, for the upper range of frequencies, the device will again be capacitive. At zero frequency, the effective capacitance of the device will essentially be equal to the sum of the first and the second capacitances, since at DC (direct current) the reactance of the inductance is obviously zero. On the other hand, at infinite frequency, the effective capacitance of the device will simply be that of the second, parallel capacitance, since the inductance now constitutes an infinite shunt thereon.

By now selecting the separate capacitance in the adjacent branch of the bridge so that its value lies intermediate the zero and infinite frequency capacitances of the crystal, it becomes possible to balance the bridge at the frequency which makes the impedance of the purely capacitive branch substantially equal in magnitude to the effective impedance of the crystal which, at this balance frequency, will be inductive. For such a balance frequency which corresponds to the center frequency of the discriminator, the two detecting arrangements located in the remaining two branches of the bridge will produce substantially equal rectified voltages and by taking the difference between these two DC output signals, it is clear that zero response will be secured at the center frequency as desired in a balanced discriminator. Moreover, as the input frequency departs from the center value, a substantial variation in the output, either in a positive or in a negative direction, will be present depending on whether the input frequency is varied towards the series or the parallel resonance of the crystal. Thus, a fairly steep and substantially linear output characteristic will be secured between the resonant and antiresonant frequencies of the crystal.

Peak responses, either in the positive or in the negative direction, will be present at these two frequencies and as the input signal further deviates from the center frequency, the amplitude of the output response will then decrease. However, since the bridge cannot become balanced again at any other frequency, it is clear that the decreases will not be ideally sharp. Moreover, in order to secure equal peaks in the response at the series or parallel resonant frequencies, the inductance of the secondary winding of the input transformer feeding the bridge should be adjusted to a suitable value which is approximately that needed for resonance with the capacitor forming the capacitive branch. Thus, apart from the fact that crystals are only operative in well determined frequency ranges, even if an equivalent arrangement using an inductance in combination with two capacitances is used instead, it is still necessary to provide an additional input transformer requiring two loosely coupled separate coils and which arrangement will naturally be a drawback, particularly at lower frequencies, as already stressed above.

While an improved operation can, as described in this U.S. Pat. No. 2,712,600, be obtained, this is at the expense of modifying the detecting circuits so that a pair of additional separate coils is introduced. Indeed, in the basic arrangement, in order to complete the DC circuits for the rectifiers it is necessary to provide resistances in shunt across the crystal and across the capacitance in the adjacent branch and in the improved arrangement, the omission of these resistances implies the addition of two antiresonant circuits.

SUMMARY OF THE INVENTION

A general object of the invention is to improve a frequency discriminator of the above type, in such a way that particularly well defined peaks in the output response can be secured, this having the advantage of eliminating the spurious effects of frequencies from adjacent bands and located near the edges of the useful frequency bandwidth considered.

A further general object of the invention is to secure such a frequency discriminator without using more than one coil with only two terminals.

Yet another general object of the invention is to realize circuit arrangements in such a way that the impedances of the detecting circuit do not have an unfavorable effect on the sharpness of the response.

In accordance with a first characteristic of the invention, angle modulation detectors as initially defined are characterized in that said second network is essentially resistive.

In accordance with a further characteristic of the invention, said first network exhibits two reversals of signs at two predetermined frequencies corresponding to opposite peaks in the output signal response at said frequencies.

Thus, by associating a resistive network with the reactive one exhibiting a series and a parallel resonance, it now becomes possible not only to secure a suitable response between the two edge frequencies, but also to have fairly sharp reductions in the output response as one goes beyond these frequencies starting from the center frequency. This is due to the fact that with the resistive network, there is secured substantially equal magnitudes for the impedances of the two networks at the center frequency, but also at two additional frequencies which are below the series resonance of the reactive network and above the parallel resonance, respectively, and also relatively close to these two edge frequencies. In fact, after reaching maximum peak response in one direction, the output signal starts to vary towards the other peak value and not towards the zero line.

Combining a resistive network with a reactive one exhibiting both series and parallel resonance is not, however, the only way in which satisfactory frequency discriminator responses can be secured which exhibit sharp peaks. Indeed, whereas the circuit just described can be used in a frequency discriminator in a particularly advantageous way, one possible drawback in some circumstances might be the fact that, since the series and parallel resonance frequencies are relatively close to one another, the parallel capacitance of the reactive network must be substantially larger than the capacitance in series with the inductance.

Another object of the invention is, therefore, to realize a frequency selective network arrangement suitable for constituting a frequency discriminator exhibiting sharp peaks at both ends of the response about the center frequency, but in which a reactance exhibiting both series and parallel resonance may be avoided.

In accordance with another characteristic of the invention each of said detecting circuits is associated to both said networks and to said source of input signal by means of a resistance and a reactance, in such a manner that at infinite frequency, each of said detecting circuits is effectively associated to a respective one out of said two networks.

Thus, in this manner, the detecting circuits are not permanently associated with a respective one of the two networks and the reactive networks need only provide a series or a parallel resonance, but not both, which means that, for instance, a high capacitance may be avoided and replaced by two additional capacitances serving, with two additional resistances, to interconnect the detecting circuit with both networks of the discriminator and the input source.

In this way, if each detecting circuit is associated with either the reactive or the resistive network at infinite frequency, this means that it will be associated with the other network at zero frequency and by having a coupling of the detecting circuits which, thus, depend on the frequency of the input signal, despite the absence of both a series and a parallel resonance in the reactive branch of the frequency discriminator, it is again possible to secure a substantially linear output response between two well defined frequencies at which the slope of the response is suddenly inverted thereby producing a sharp discrimination with respect to signals near the useful bandwidth, but outside thereof.

It should be noted that frequency discriminators avoiding reactive branches exhibiting both a series and a parallel resonance have already been disclosed in U.S. Pat. No. 3,217,263 as well as in British Pat. No. 1,081,852.

In the first patent, the basic arrangement involves a capacitance in series with a resistance, this series circuit being connected in parallel with another involving this time an inductance in series with another resistance. The parallel combination is fed by a source of input signal current via a common resistance. The respective voltages across the two series combinations involving the common resistance and either of the other are rectified and the difference between the two constitutes the frequency discriminator output. In this manner, it is not, however, possible to produce a response exhibiting sharp positive and negative peaks terminating a substantially linear response about the center frequency.

An improved arrangement said to permit the elimination of harmonics, particularly the second, may be secured by introducing a series resonance in one of the two parallel circuits. Indeed, the basic arrangement permits to secure zero output response at the frequency for which the impedance of the capacitance has substantially the same magnitude as that of the inductance. If a series resonance is introduced in one of the two networks, it is now in principle possible to have zero response at two frequencies. However, if this is achieved by adding a capacitance in series with the inductance, this means that the center frequency should now correspond to that frequency for which the impedance of the capacitance is substantially equal to the capacitive impedance of the series resonant branch. Indeed, in this manner, it is possible to have the magnitude of the capacitive impedance also equal to the magnitude of the impedance of the series resonant branch at the second harmonic frequency, this being then inductive. In this way, however, the response cannot be particularly sharp.

This state of affairs can be remedied by having an additional inductance instead of an additional capacitance, and preferably a common coil with a tapping point, or two separate intercoupled coils. But apart from the additional inductance, in any event this scheme cannot provide sharp peaks in the response on both sides of the center frequency.

In British Pat. No. 1,081,852, again the basic circuit uses two parallel branches each comprising an impedance, in series with an inductance for the first branch and with a capacitance for the second. Again, this cannot provide a response with sharp peaks and moreover, in order to secure an adequately high value for the two impedances in series with the inductance and with the capacitance, it is proposed to use an antiresonant circuit. Even if the latter is used in common for both branches, it will, thus, imply the incorporation of an additional coil which will also need to have a midpoint tapping, if two capacitors are not to be used, in order to effect the connection to the source of input signals.

While both the arrangements proposed in the present application have the advantage of securing a response exhibiting sharp peaks, if the impedances of the detecting circuits are not sufficiently high, or sufficiently low, depending on the type of circuit which is adopted, this may effect the response to some extent. Indeed, it is a drawback of the circuit of U.S. Pat. No. 2,712,600, that for an ideal operation the impedances of the detecting circuits should be very low, since they are in series with the capacitive, or with the crystal network. When a resistive network is used instead, then, for the arrangement of the first type it becomes possible to take the effective resistance of the detector into account. Moreover, if an arrangement is used in which the two networks are in series across a voltage source, it will generally be easier to secure a relatively high impedance detecting circuit which can be branched across the reactive part of the frequency discriminator so as not to affect its performance. However, with this arrangement, the detecting circuits have only one common terminal with either the live or the ground terminal of the input signal source and accordingly there is the problem of suitably connecting the ungrounded detecting circuit to the frequency selective network.

This problem is of course duplicated when an arrangement of the second type is used in which the detecting circuits are not permanently associated with one of the two branches. Then, neither detecting circuit can have a common terminal with the source of input signals.

Accordingly, yet a further object of the invention is to secure a simple circuit arrangement for the connection of the detecting circuit to the frequency selective network in such a manner that the impedances of the detecting circuits do not impede the operation of the frequency selective network, but also in such a way that the final output voltage representing the difference between the magnitudes of the two rectified output signals is developed across an impedance which has a common terminal with the source of input signals.

In accordance with yet another characteristic of the invention, said reactive and resistive networks are connected in series across the source of input signals and the input of an amplifier having a relatively high input impedance is connected across said reactive network, the output of said amplifier being coupled to the first of said detecting circuits while the second of said detecting circuits is coupled across said resistive network.

In this manner, with like detecting circuits, using a unity gain amplifier producing at its output a voltage which is a replica at lower impedance level of that across the reactive network of the frequency discriminator, the output resistance of this amplifier should be equal to the effective resistance of the resistive network. In this manner, the advantageous characteristic of the frequency discriminating network can be fully preserved irrespective of the load presented by the detecting circuits.

Having now described the essential characteristics of the frequency discriminators in accordance with the invention as compared to those of the prior art, in brief, a preferred embodiment of the invention consists in applying the input signal to an emitter-follower feeding a reactive network comprising an inductance and two capacitances, in series with a resistive network. A second transistor has its base-to-emitter circuit coupled through an emitter resistance across the reactive network and the signal at the collector is coupled to the base of a third transistor. The latter has its emitter-to-collector path coupled in series across the supply with the collector-to-emitter path of a fourth transistor whose base is coupled to the junction point of said reactive and resistive networks. The third transistor is of opposite conductivity type with respect to the other three and together with the fourth transistor operate as rectifier-amplifiers, the output signal at their commoned collectors representing the difference between the magnitudes of the respective voltages across the reactive and resistive networks.

It can still be noted that it is already known from U.S. Pat. No. 2,878,384 to use transistors of opposite conductivity types in frequency discriminators of the balanced type, i.e. of the Foster-Seeley or ratio detector types. In the first alternative, however, the two transistors are operated in grounded collector fashion, the two input signals being supplied either at the bases or at the emitters, and it is necessary that the supply battery should have a midpoint tapping to which the base-emitter circuits of the two transistors are coupled. Likewise. this midpoint battery tapping is also present in the case of the ratio detector embodiments in which the output signals appear at the collectors, the input signals being again supplied either at the bases or at the emitters. On the other hand, with the arrangement of the present application a PNP and an NPN transistors with their collectors commoned to provide the output potential may simply have their emitters coupled across an ordinary battery supply through emitter resistances, with the bases being returned to one or the other pole of this battery through respective base resistances.

BRIEF DESCRIPTION OF THE DRAWING

The above-mentioned and other objects and features of this invention will become more apparent by reference to the following description taken in conjunction with the accompanying drawings, in which:

FIG. 1 is a schematic diagram, partially in block form, of a first embodiment of the invention using a reactive network exhibiting both series and parallel resonance and with low impedance detecting circuits;

FIG. 2 is a schematic diagram, partially in block form, of a modification of the arrangement of FIG. 1 enabling the use of detecting circuits having relatively high impedances;

FIG. 3 is a schematic diagram, partially in block form, of a further embodiment of the invention using detecting circuits which are not directly associated either to the reactive or the resistive network of the frequency discriminator;

FIG. 4 is a schematic diagram, partially in block form, of a modification of the circuit arrangement of FIG. 3 wherein relatively low impedance instead of relatively high impedance detecting circuits may be used;

DESCRIPTION OF THE PREFERRED EMBODIMENTS

Figure 5:
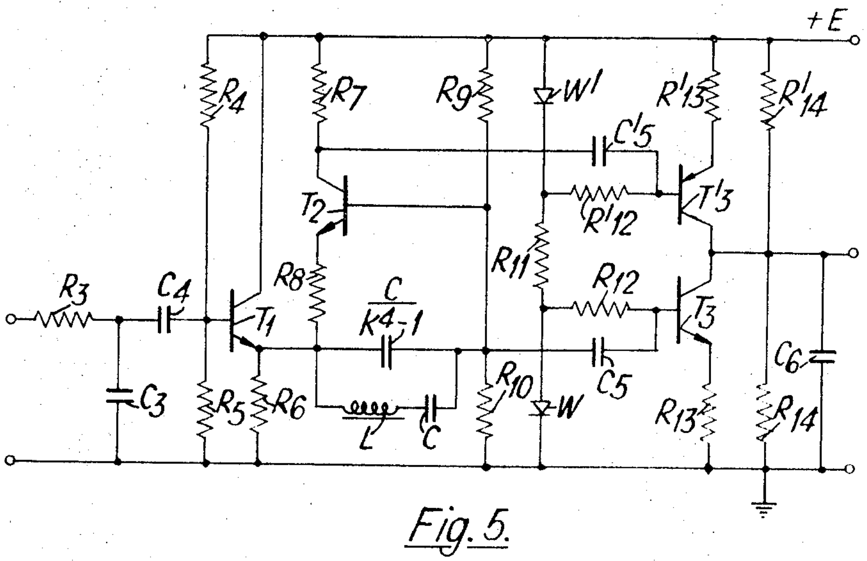
FIG. 5 is a detailed schematic diagram of the complete frequency discriminator circuit, including the detecting circuits, using the frequency selective network of FIG. 2.

Referring to FIG. 1, the latter represents a current source $i$ feeding two impedance networks in parallel. The first network is a reactive network comprising capacitance C in series with inductance L, these two elements being shunted by a capacitance $C/k^4-1$ ($k$ is a constant slightly larger than unity whose significance will appear later), in series with a detecting circuit $D_1$ whose input impedance is relatively low. The second network comprises resistance R in series with a second detecting circuit which may be identical to detecting circuit $D_1$.

If $i_1$ and $i_2$ are the respective currents through the networks including $D_1$ and $D_2$, the response of a frequency discriminator using the frequency selective circuit of FIG. 1 will be taken as proportional to the difference between the magnitudes of these two currents. These will be equal at the center frequency of the discriminator provided that the circuit is so designed that the overall reactance of the network including the two capacitances and the inductance is inductive and has a magnitude equal to R. At the frequency of series resonance between L and C, current $i_1$ will be maximum while at the antiresonant frequency of the reactive network it is current $i_2$ which reaches a maximum value. In this light, an output response with two sharp peaks is secured. The peaks will be particularly sharp because, contrary to the circuit arrangement of the U.S. Pat. No. 2,712,600, a resistance R and not a further capacitance is used. This means that at frequencies respectively below series resonance and above parallel resonance and not far distant from these frequencies, the impedance of the reactive network may in both cases by capacitive and have a magnitude equal to R, thereby producing also zero response as at the center frequency when the reactive network is inductive.

Clearly, at zero and infinite frequencies, the reactive network has a very high, or a very low, impedance, respectively, so that at these frequencies the response tends to reach the respective positive and negative peak values.

Thus, the general characteristic of the output response is of the type represented in FIG. 6 which will be discussed in more detail later.

FIG. 2 represents an alternative circuit arrangement which can be derived from that of FIG. 1 by the well known rules of duality followed by a low/high frequency conversion. In other words, the two parallel networks of FIG. 1 fed by a current source are replaced by the two series networks shown in FIG. 2 to be across the voltage source $e$. Instead of detecting circuit $D_1$ being in series with the reactance, FIG. 2 shows that it is now in parallel thereto and likewise, detecting circuit $D_2$ is in parallel across the resistance. Duality should of course produce for the three element reactance of FIG. 1 a like arrangement, but with two inductances and one capacitance. However, bearing in mind the desire to limit the number of inductances, particularly for VF telegraphy applications, in the circuit of FIG. 2, exactly the same reactance arrangement as in FIG. 1 has been retained.

If X represents the reactance of the network comprising the two capacitances and the inductance, the normalized response $r$ of the frequency selective network of FIG. 2 which is to be the essential part of the frequency discriminator can be readily calculated. Indeed, the normalized output response $r$ is simply the difference between the magnitudes of $r_1$ and $r_2$ where these represent the respective ratios between the magnitudes of $r_1$ and $r_2$ where these represent the respective ratios between the voltages across X and R, divided by the applied voltage $e$. Thus, the output response $r$ can be written as $$r=|r_1|-|r_2|=\left|\frac{jX}{R+jX}\right|-\left|\frac{R}{R+jX}\right|=\frac{1}{\left|\sqrt{1+\frac{R^2}{X^2}}\right|}-\frac{1}{\left|\sqrt{1+\frac{X^2}{R^2}}\right|} \quad (1)$$

Reactance $X$ can be expressed as $$X=\frac{1=k^4}{wC}\,\frac{WL-\frac{1}{wC}}{wL-\frac{k^4}{wC}}=\frac{k^4-1}{wC}\,\frac{w^2-w_s^2}{k^4w_s^2-w^2} \quad (2)$$

where $w$ is the angular frequency and the value of $w_s$ corresponds to series resonance of the reactance X, i.e.

$$w_s^2LC=1$$

Clearly, equation (2) indicates that $w_p=k^2w_s$ is the parallel resonance frequency of the reactance X and therefore $k^2$ is a factor larger than unity representing the ratio between the parallel and the series resonance frequencies.

The response $r$ of the frequency discriminator should be reasonably linear between $w_s$ and $w_p$ through the origin of the response versus frequency characteristic, this origin corresponding to a center angular frequency $w_o$. If the overall response is to be skew symmetrical as a function of the frequency variable normalized about $w_o$, this means that if the frequency is inverted with respect to the center frequency, $r$ should change in sign but not in magnitude. Equation (1) indicates that such a frequency inversion should, therefore, correspond to $X/R$ becoming $R/X$. Thus, a frequency inversion about $w_o$ should lead to a reactance inversion about R and, at the angular frequency $w_o$, the magnitude of the reactance should be equal to R, giving zero response at that frequency.

The normalized reactance $x$, i.e. the ratio between X and its value at $w_o$, i.e. R, is $$x=\frac{w_o}{w}\,\frac{w^2=w_s^2}{w_o^2-w_s^2}\,\frac{k^4w_s^2-w_o^2}{k^4w_s^2-w^2} \quad (4)$$

This value $x$ should therefore become $\frac{1}{x}$ if $u$ becomes $\frac{1}{u}$, $u$ being the normalized frequency variable, i.e., $$u=\frac{w}{w_o} \quad (5)$$

The condition can be shown to lead to $$w_o=_s, \quad (6)$$

or in other words, $w_o$ should be the geometric means of the series and parallel resonance frequencies of X. Replacing $w_o$ in equation (4) by the value given by equation (6), and using equation (5).

$$x=\frac{1}{u}\left(\frac{k^2u^2-1}{k^2-u^2}\right) \quad (4')$$

in which it may readily be verified that replacing $u$ by $\frac{1}{u}$ leads to $x$ becoming $\frac{1}{x}$. The condition that the magnitude of X at $w_o$ be equal to R, can thus be written $$R=\frac{k^4-1}{w_oC}\,\frac{w_o^2-w_s^2}{k^4w_s^2-w_o^2}=\frac{k^4-1}{w_sCk^3}=\frac{k^4-1}{w_oCk^2} \qquad (7)$$

The response $r$ given by equation (1) can be written $$r=\frac{1}{\left|\sqrt{1+\frac{1}{x^2}}\right|}-\frac{1}{\sqrt{1+x^2}} \qquad (1')$$

and using equation (4′), at the origin, i.e., with $x=u=1$, the slope of $r$ in function of $u$ can be found to be $$\left|\frac{dr}{du}\right|u=1=\frac{1}{\sqrt{2}}\,\frac{(k^2+3)}{k^2-1}=\frac{\sqrt{2}}{k-1} \qquad (8)$$

the approximate value being due to the $k-1$ being small.

Considering equation (1), it is clear that at $w_s$, X is very small as compared to R and accordingly $r=-1$. Likewise, at parallel resonance, R is very small as compared to X and $r=1$. The parallel and series resonance frequencies are separated by $(k^2-1)w_s$ so that if an ideally straight characteristic was maintained between the extreme frequency values $w_s$, or $u=\frac{1}{k}$, and $k^2w_s$ or $u=k$, its slope would be $\frac{2k}{k^2-1}=\frac{1}{k-1}$. With practical values of $k$ not very much larger than unity, the fact that the actual slope at the origin given by equation (8) is not very much larger than the slope of this straight line indicates that a good linearity of response is achieved by the circuit.

All the elements of the network are now determined in terms of R. Indeed, once the center frequency $w_o$ is known as well as those where maximum response is achieved, i.e., $\frac{w_o}{k}$ and $kw_o$, $k$ is also determined, which means that C is obtained from equation (7). The parallel capacitance is also known since it was defined in terms of C and $k$. Finally, L is obtained from equation (3). It is to be noted that in a multichannel telegraph system for instance, it will be possible to use the same L value for all channels, i.e., coils from a single series, by modifying the values of R and C.

Figure 6:
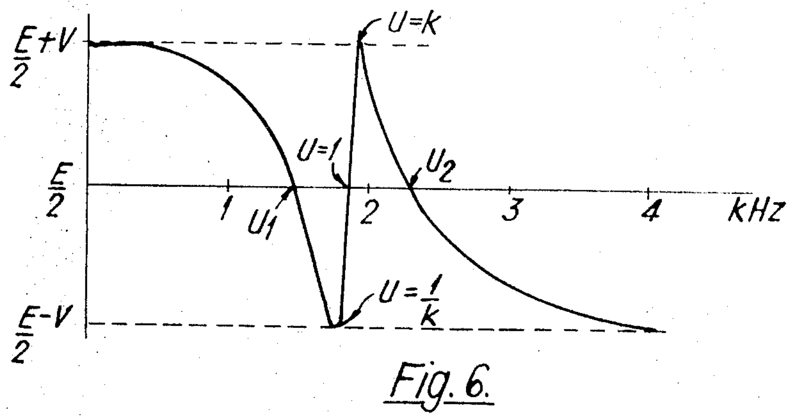
FIG. 6 is a curve illustrating the output response as a function of frequency for the circuit of FIG. 5.

The frequency discriminator arrangement of FIG. 2 enables a particularly sharp characteristic of the type indicated in FIG. 6 to be obtained, since after peak unity values are obtained when $x$ in equation (1) is equal to zero or infinity, $r$ rapidly diminishes towards zero and beyond. This is due to the fact that as indicated by equation (1′), zero response can be obtained at the center frequency when $x=1$, but zero response is equally obtainable when $x=-1$. In order to find the corresponding frequencies at which this occurs, or the corresponding normalized frequencies $u$, $x$ defined by equation (4′) should, therefore, be equated to $-1$, i.e., $$\frac{1}{u}\,\frac{(k^2u^2-1)}{k^2-u^2}=-1 \qquad (9)$$

This is a cubic in $u$, but one of the roots being the negative of the center frequency, i.e., $u=1$ 1, the two roots of interest, i.e., $u_{1,2}$ giving the normalized frequencies of zero response on both sides of the peaks away from the center frequency are given by $$u_{1,2}=1+k^2\pm\sqrt{(1+k^2)^2-4}=k\pm\sqrt{2(k+1)} \qquad (10)$$

in which the second expression is an approximation obtained due to $k-1$ being relatively small with respect to unity.

Before considering the circuit of FIG. 3 which is a variant of that of FIG. 2 and to facilitate a comparison between the two, the normalized response $r$ given by equation (1′) will now be expressed in terms of a further dimensionless variable $y$ which is defined by $$x=\tan\left(y+\frac{\pi}{4}\right)=\frac{1-\tan y}{1-\tan y} \qquad (11)$$

If $x$ is replaced by the first above expression in equation (1′), the normalized response may now be written as $$r=\left|\sin\left(y+\frac{\pi}{4}\right)\right|-\left|\sin\left(y-\frac{\pi}{4}\right)\right| \qquad (12)$$

which leads to $$r=\sqrt{2}\sin y\,|y|\leq\frac{\pi}{4} \qquad (13)$$

$$r=\sqrt{2}\cos y\,|y|\geq\frac{\pi}{4} \qquad (14)$$

$$r=-\sqrt{2}\cos y\,|y|\leq-\frac{\pi}{4} \qquad (14')$$

In order to stress the correspondence between the critical values of $x$ and $y$, as well as those of $y+\pi/4$ immediately deduced, therefrom, these are tabulated immediately below together with the main critical values for the normalized frequency variable $u$ i.e., $k$ and $1/k$ at the peak frequencies and 1 at the center frequency x −oo −1 0 1 ±00 −1 0 y −3π/1 −π/2 −π/4 0 π/4 π/1 3π/4 y+π/4 −π/2b/4 0 π/4 π/2 3π/4 π u 1/k 1 k (15)

Thus, while $y$ is of course a complex function of the frequency implicitely defined by equations (11, (4′) and (4), the response $r$ can be expressed by a simple sine wave function within the passband, i.e. between the peaks, and by simple cosine waveforms outside.

FIG. 3 represents an alternative frequency selective network to that of FIG. 2 which produces a characteristic showing substantial resemblance to that of the FIG. 2 network, except that beyond the peaks, the response does not pass again through zero, although it exhibits sharp dips towards the zero line, whereby a sharply selective action outside the useful frequency range limited by the values of $k$ and $1/k$ for $u$ is again obtained.

A possible advantage of the network of FIG. 3 is that at least when the impedances of the detectors are high enough, the highest capacitance value may be lower. Indeed, it is appreciated from FIG. 2 that the value of the capacitance in shunt across the series circuit formed by L and C will be substantially larger than C, since $k$ is not much larger than unity. In FIG. 3, this shunt capacitance is avoided, the main reactive network comprising only the inductance $L_0$ in series with the capacitance $C_0$, this being again connected in series with a resistance $R_0$ across the source of input signal voltage $e$. Again, the two detecting circuits $D_1$ and $D_2$ are connected at one of their terminals to the junction of the series resonant circuits $L_0$ $C_0$ with the resistance $R_0$, but instead of being respectively in shunt across this reactance and resistance as was the case in FIG. 2, their other terminals are connected to impedance voltage dividers coupled also across the signal voltage $e$. Thus, the other terminal of $D_1$ is connected to the junction of capacitance $C_1$ and resistance $R_1$ which are coupled in series across $e$, while the other terminal of $D_2$ is likewise connected to the junction of resistance $R_2$ with capacitance $C_2$ again connected in series across $e$, with $R_2$ and $C_1$ connected to the same terminal of $e$. This means that at infinite frequency, for instance, it is $D_1$ which is practically in shunt across $L_0$ $C_0$, since the impedance of $C_1$ is very low, whereas in view of the impedance of $C_2$ being likewise low, $D_2$ is at that frequency practically in shunt across $R_0$. Substantially inverted conditions are obtained at zero frequency.

The response of the network of FIG. 3 may be written as $$r=|r_1|-|r_2|$$

$$=\left|\frac{j\omega C_1R_1}{1+j\omega C_1R_1}-\frac{\omega C_0R_0}{\omega C_0R_0-j(\omega^2L_0C_0-1)}\right|-\left|\frac{1}{1+j\omega C_2R_2}-\frac{\omega C_0R_0}{\omega C_0R_0-j(\omega^2L_0C_0-1)}\right|$$

$$=\left|\frac{1}{1-j\frac{\tan b}{u}}-\frac{1}{1+j\tan z}\right|-\left|\frac{1}{1+ju\tan b}-\frac{1}{1+j\tan z}\right| \qquad (16)$$

in which the last expression is obtained by introducing the fixed and frequency dependent dimensionless parameters $b$ and $z$ respectively defined by $$\tan b=\frac{1}{w_0C_1R_1}=w_0C_2R_2 \qquad (17)$$

$$\tan z=\frac{wL_0}{R_0}-\frac{1}{wC_0R_0} \qquad (18)$$

where in equation (17), by definition, $w_o$ is again the center frequency at which the normalized response $r$ should be zero.

In order to further simplify the second expression for $r$ given by equation (16) and bring it to a form similar to that obtained for the first network of FIG. 2, i.e., equation (12), further dimensionless frequency parameters $z_1$ and $z_2$ can be introduced. These are respectively defined by tan $$z_1=\frac{1}{u}\tan b \qquad (19)$$

tan $z_1$=$u$ tan $b$ (19) tan $z_2$=$u$ tan$b$(20) and substitution into equation (16) leads to $$r=|\sin(z+z_1)|-|\sin(z-z_2)| \quad (21)$$

which will be recognized as a more general form of equation (12) corresponding to the network of FIG. 2. Indeed, in the particular case where $b=\eta/4$, or in other words when tan $b$ is equal to unity, corresponding to equal time constants $C_1R_1$ and $C_2R_2$, equations (17), (19) and (20) indicate that when the frequency variable $u$ is reasonably close to unity, both $z_1$ and $z_2$ will also be practically equal to $\eta/4$ so that in such a case equation (21) would correspond to equation (12) except that $z$ and $y$ are not the same functions of $u$. It will in fact be shown that such a value of $\eta/4$ for $b$ is a preferred one leading to a characteristic for the network of FIG. 3, which without being identical to that of the network of FIG. 2 nevertheless possesses its essential property of substantial linearity between the two peaks and sharp decreases towards the zero level immediately beyond the two peaks.

At the center frequency $w_0$, $u$ is equal to 1 and accordingly, in view of equations (19) and (20), $z_1$ and $z_2$ are both equal to $b$. Therefore, considering equations (21) it is clear that zero response will be obtained at the center frequency, if $z=0$ for that frequency. In turn, by considering equation (18) and bearing in mind the definition of $w_0$ given by equation (17), this leads to $$w_0^2=\frac{1}{C_1R_1C_2R_2}=\frac{1}{L_0C_0} \qquad (22)$$

so that equation (18) may now be rewritten as $$\tan z=\frac{W_0L_0}{R_0}\left(u-\frac{1}{u}\right)=Q\left(u-\frac{1}{u}\right) \qquad (23)$$

in which the quality factor $Q$ is implicitly defined as the impedance of the inductance at the center frequency divided by the resistance $R_0$.

Whereas $z$ starts from zero at $u$ equal to unity, at the center frequency, both $z_1$ and $z_2$ are equal to $b$. Equation (2) indicates that as long as $z$ varies between the limits $z_2$ and $-z_1$, the normalized response $r$ may be written as $$r=2\cos\frac{z_1+z_2}{2}\sin\left(z+\frac{z_1-z_2}{2}\right)\doteq 2\cos b\sin z \quad -z_1\leq z\leq z_2 \qquad (24)$$

in which the second approximate expression is obtained when both $z_1$ and $z_2$ are sufficiently near $b$, i.e., when the deviation from the center frequency is small enough. Similar expressions can be derived from equation (21) when $z$ exceeds $z_2$, or on the other hand becomes more negative than $-z_1$, i.e., $$r=2\sin\frac{z_1+z_2}{2}\cos\left(z+\frac{z_1-z_2}{2}\right)\doteq 2\sin b\cos z \quad z\geq z_2 \qquad (25)$$

$$r=-2\sin\frac{z_1+z_2}{2}\cos\left(z+\frac{z_2-z_1}{2}\right)\doteq -2\sin b\cos z \quad z\leq -z_1 \qquad (25')$$

Thus, apart from $y$ and $z$ being different functions of $u$, there is a striking similarity between equations (13), (14), (14′) on the one hand and equations (24), (25), (25′) on the other. In the three approximate expressions which are given immediately above, care should be taken to recall that they are valid for sufficiently small variations of $u$ about unity. This is certainly true for equation (24) defining the useful range of variations. Indeed, it is clear from equation (21) that when the main frequency variable $z$ reaches either of the auxiliary frequency variables $z_2$ or $-z_1$, the response peaks are being reached, since for such extreme values of $z$, one of the two terms in equation (21) becomes zero. Calling the peak normalized frequencies $k$ and $1/k$ as for the circuit of FIG. 2, it may, thus, be written at the normalized frequency $k$ or $1/k$:

$$\tan z_2=-\tan z_1=Q(k-1/k)=k\tan b \quad (26)$$

which establishes a relation between the constant parameters $k$, $b$ and $Q$, i.e., $$\tan b=Q(1-1/k^2) \quad (27)$$

Since $k$ will only be slightly larger than unity, the second approximate value of equation (24) is quite justified. Likewise, outside the useful frequency bandwidth, but still near the peak normalized frequencies $k$ and $1/k$, the second approximate expressions given by equations (25) and (25′) are also still correct so that near the center frequency, but not necessarily within the substantially linear range between the two peaks, the response will be quite similar to that of the network of FIG. 2, i.e., equations (13), (14) and (14′). However, as the frequency goes well beyond either peak, then the approximate expressions of equations (25) and (25′) are no longer correct. Indeed, as one goes beyond the peak regions, the response of the network of FIG. 3 now becomes different from that of the network of FIG. 2 and represented in FIG. 6. After a return towards zero level on both sides of the peaks away from the center frequency, the response will again increase in magnitude in the direction taken when departing from the center frequency.

Thus, considering the exact value for $r$ given by equation (25), as the frequency increases towards infinity, $z$ will tend towards $\pi/2$, $z_1$ will tend towards zero and $z_2$ will tend towards $\pi/2$. In that case, it is readily seen that $r$ as the frequency increases towards infinity, will tend towards 1 and not towards −1 as was the case of the network of FIG. 2 whose characteristic appears on FIG. 6. Likewise, by considering the exact expression for $r$ given by equation (25′), it will be clear that as the frequency tends towards zero, $r$ given tends towards −1. This is readily verified when considering the network of FIG. 3 at extreme frequencies.

Equation (26) indicates that there is a degree of freedom for the parameters, since while $k$ will be given by the desired bandwidth for the system, $Q$ and $b$ are in principle arbitrary provided they satisfy the relation. It has already been indicated that with a value of $b=\pi/4$, there is very close correspondence between the characteristic of the network of FIG. 3 and that of the network of FIG. 2 at least between and immediately after the peaks in the response. Before establishing that this is indeed a preferred value, it will first be shown that the characteristic defined by equation (21) is also skew symmetrical in terms of $u$ in the same manner as was the case for the response produced by the network of FIG. 2. Indeed, it is clear that if $u$ is replaced by $1/u$, in view of (23) this will imply a change of sign for $z$. Also, in the light of the definitions of (19) and (20) this will imply that $z_1$ and $z_2$ are exchanged for one another. By considering (21) it is then clear that replacing $u$ by $1/u$ will change the sign of $r$ thus again producing a response which is skew symmetrical about the center frequency as a function of a logarithmic frequency variable.

The response of the network of FIG. 3 having been shown to be skew symmetrical, it is of course sufficient to consider, say the positive half of the response $r$ defined by equation (21) in order to determine its slope at the more critical points. Therefore, when $r$ is positive, its slope relative to $u$ may be written as $$\frac{dr}{du}=\left(\frac{dz}{du}+\frac{dz_1}{du}\right)\cos(z+z_1)\pm\left(\frac{dz}{du}-\frac{dz_2}{du}\right)\cos(z-z_2) \quad (28)$$

in which the positive sign for the second term should be used as long as $z$ is smaller than $z_2$, whereafter the negative sign should be used. Thus, with different slopes for $z$ and $z_2$ at the point of the characteristic where $z=z_2$, the slope of the response presents a discontinuity. By definition, this point in the characteristic corresponds to a value of $u=k$ and this will be particularly clear if the expression for $z$ as a function of $u$, i.e., equation (23), is transformed by replacing $Q$ as a function of the parameter $b$ as obtained from equation (27). This leads to $$\tan z=\frac{k^2(u^2-1)}{u(k^2-1)}\tan b=\frac{k^2}{k^2-1}(\tan z_2-\tan z_1) \quad (29)$$

which, together with equation (20) indicates that when $u=k$, $z=z_2$.

The slope of the response $r$ as a function of $u$ involves, as shown by equation (28), the derivatives of $z$, $z_1$ and $z_2$ with respect to $u$, these being readily obtained from equations (19), (20) and (29). From equation (28), the slope at the origin, i.e., the center frequency, where $u$ is equal to unity can be found to be $$\left|\frac{dr}{du}\right|u=1=\frac{4k^2}{k^2-1}\sin b-\sin 2b\cos b\doteq\frac{2\sin b}{k-1} \quad (30)$$

the second approximate expression resulting from $k$ being not much larger than unity. It is interesting to compare this slope at the origin with that for the network of FIG. 2 and given by equation (8), since it is seen that the two are equal when $b=\eta/4$ That such a value is indeed a preferred one will now be justified by considering the slopes at the points of discontinuities, e.g., $u=k$, for the positive half of the response.

At such a point in the characteristic, the second term in equation (28) is the significant one, since $z=z_2$, whereas on the other hand, it is clear from equations (19) and (20) that $z+z_1$ influencing the first term is close to $2b$ and if it is possible to show that $b=\pi/4$ is a preferred value, then it is indeed clear that this first term is certainly negligible with regard to the second. Moreover, this second term changes sign at the point of discontinuity to reverse the sign of the slope and it is, thus, this term which should be as large as possible in order to obtain a sharp fall-off in the characteristic as one passes its peaks. Thus, the magnitude of the slope at $u=k$ is defined by the difference between the derivative of $z$ and that of $z_2$, both with respect to $u$, i.e., $$\left|\frac{dz}{du}-\frac{dz_2}{du}\right|u=k=\left|\frac{2\tan b}{(k^2-1)(1+k^2\tan^2 b)}\right| \quad (31)$$

The above value for the slopes at the discontinuity points indicates that it will be maximum and equal to $(1/k(k^2-1)\doteq 2/k-1$ upon $\tan b$ being chosen equal to $1/k$. Thus, a value of $b=\pi/4$ is indeed a preferred one.

Considering the peak response at $u=k$, or its inverse, it is readily obtained from equation (21) with one of the two terms thereof being equated to zero, i.e., $$r_k=-r_{1/k}\frac{(k^2+1)\tan b}{\sqrt{(1+k^2\tan^2 b)(k^2+\tan^2 b)}}\doteq\sin 2b \quad (32)$$

where the first exact expression indicates that maximum peaks will be obtained when $\tan b$ is equal to unity, whereas the second approximate value is readily obtained by considering that $k$ is close to unity.

With the optimum value of $b$, the peaks in the response have unit amplitude as for the response of the network of FIG. 2, i.e., equation (1'). This means that for this preferred value, not only are the center slopes equal, but the peak-to-peak slopes are also the same for the two circuits.

Although there is a reversal of slopes at $u=k$, the response does not continue to decrease and after a certain frequency is reached, it will again increase, tending to unity value when the frequency is infinite. In view of the second term in equation (28) being the significant one, the frequency at which the slope of the positive half of the response $r$ again becomes positive may readily be calculated by finding the value of $u$ for which the derivative of $z$ is equal to that of $z_2$, i.e., $$\frac{k^2(u^2+1)}{u^2(k^2-1)}\cos^2 z=\cos^2 z_2 \quad (33)$$

which is readily obtained from equations (20) and (29). This leads to a quadratic in $u^2$ which, when solved for $\tan b=1/k$, and bearing in mind that $k$ is close to unity, gives the normalized frequency $u_m$ of minimum response from $$u_m^2=4k-3\pm\sqrt{8(k-1)} \quad (34)$$

The two roots correspond of course to the two turning points in the characteristic on each side of the center frequency and it is seen that these particular values of $u$ are practically identical to those given by equation (10), i.e., the frequencies at which the response is zero on each side of the center frequency for the network of FIG. 2.

As compared to the circuit of FIG. 2, that of FIG. 3 offers the advantage that a capacitor substantially larger than C (FIG. 2), or $C_0$ (FIG. 3), need no longer be used, since $C_1$ and $C_2$ are simply determined from equation (17) providing for equal CR time constants, if $\tan b$ is optimized to unity. The above analysis of the circuit of FIG. 3 has assumed that the impedances of the detecting circuit $D_1$ and $D_2$ were so high that they could be neglected. This will be true as long as the resistances $R_1$ and $R_2$ are not unduly high, or correspondingly, as long as the capacitances $C_1$ and $C_2$ are not unduly small.

FIG. 4 represents a circuit derived from that of FIG. 3 by applying the rules of duality and making a low/high frequency conversion so as to avoid the replacement of the capacitances $C_1$ and $C_2$ by inductances. Thus, the four branches connected to the common node for $D_1$ and $D_2$ in FIG. 3 now constitute a corresponding mesh in FIG. 4 with an antiresonant $L_0C_0$ circuit instead of a resonant circuit and with low impedance detecting circuits now being used for $D_1$ and $D_2$. Likewise, the other branches connected to the remaining terminals of $D_1$ and $D_2$ in FIG. 3, i.e., $D_1$, $C_1$, $R_1$ and $D_2$, $C_2$, $R_2$ are also arranged in respective meshes in FIG. 4. Finally, the meshes of FIG. 3 involving the voltage source $e$ and $C_1$, $R_1$ as well as $e$ and $C_2$, $R_2$ are now replaced by nodes in FIG. 4 to which a current source $i$ is shown to be connected.

In a practical circuit for the detectors $D_1$ and $D_2$, it would be desirable that the latter would influence as little as possible the operation of the frequency selective network just described. With the use of transistors, it is possible to have sufficiently high impedances for the detecting circuits to achieve this result and accordingly on these premises, either the circuit of FIG. 2, or that of FIG. 3 is suitable. However, in a practical circuit it would also be desirable to have a common terminal between the input and output circuits, this being achieved by the circuit of FIG. 2. Moreover, with this common terminal grounded, one of the two detecting circuits, i.e. $D_2$, may also be grounded, whereas $D_1$ and $D_2$ in the circuit of FIG. 3 could only be grounded with an ungrounded signal input. The only problem for the circuit of FIG. 2 is to realize a suitable detecting circuit $D_1$ none of whose terminals may be grounded and which affects as little as possible the reactance X.

FIG. 5 shows a detailed circuit based on the frequency selective network of FIG. 2. The latter is fed by a low impedance source constituted by the emitter-follower using the NPN transistor $T_1$. The original signal may be assumed to be delivered by a suitable limiter circuit (not shown) and, therefore, a ratio detector type of circuit need not be used. The disturbing effect of the harmonics generated by the squaring effect of the limiter can be reduced to a negligible value by the insertion of the input low pass section $R_3$–$C_3$ producing a loss of some 3 decibel at the fundamental frequency. In this manner, the only remaining effect of the harmonics is a shift in the center frequency of the order of 1 Hz. for a center frequency of 1860 Hz. which is encountered in multichannel telegraph systems. The input signal across shunt capacitance $C_3$ is coupled to the base of $T_1$ through coupling capacitance $C_4$, this base being biased by means of voltage divider $R_4$–$R_5$ coupled across the terminals of a power supply indicated by +E and 0, the collector of $T_1$ being directly connected to +E.

In order to avoid a disturbing effect from a detecting circuit coupled across the reactive network to the frequency discriminating network constituted by L, C and C/ k4'1, the emitter of $T_1$ is coupled to the emitter of a further NPN transistor $T_2$ through the emitter resistance $R_8$, while the terminal of the reactive branch on the other side of the emitter of $T_1$ is directly coupled to the base of $T_2$ which is biased by means of the voltage dividers $R_9$–$R_{10}$ coupled directly across the terminals of the power supply, the collector of $T_2$ being connected to +E through resistance $R_7$.

In this way, transistor $T_2$ acts as a buffer amplifier and the resistive loading across the reactive network can be substantially neglected, the voltage across that branch being reproduced at low impedance level across the collector load of $T_2$. On the other hand, the second signal to be rectified is to be found across resistance $R_{10}$. If like detecting circuits are coupled across $R_7$ and $R_{10}$, the preceding analysis of the circuit of FIG. 2 will remain entirely valid provided the ratio between the rectified output signals produced by these detecting circuits always remains equal to that between $r_1$ and $r_2$. If both detecting circuit see the same source impedance and if the applied voltages are in the ratio between $r_1$ and $r_2$, this means that amplifier using $T_2$ should provide unity gain and offer an output resistance equal to R.

The respective detecting circuits coupled across resistances $R_{10}$ and $R_7$ are essentially constituted by further transistor $T_3$ and $T'_3$ which act as halfwave rectifier-amplifiers. Whereas transistor $T_3$ is again of the NPN type, having its base coupled to the junction of the reactive and resistive networks through coupling capacitor $C_5$, transistor $T'_3$ is of the PNP type and has its base connected to the collector of transistor $T_2$ through coupling capacitor $C'_5$. Indeed, whereas transistor $T_3$, whose collector is directly connected to the collector of transistor $T'_3$ and constitutes the output terminal of the frequency discriminator, has its emitter returned to ground through resistance $R_{13}$, the emitter of transistor $T'_3$ is returned to the positive power supply terminal +E through resistance R
The use of a prime for some elements indicates that they are of like values, the characteristics of the transistor $T_3$ and $T'_3$ being likewise matched though these are of opposite conductivity types. In this way, the base of transistor $T_3$ can be returned to ground through base resistance $R_{12}$, whereas the base of transistor $T'_3$ is coupled to the positive power supply terminal +E through resistance $R'_{12}$. The terminals of resistances $R_{12}$–$R_{12}'$ away from the bases are, however, not directly connected to the battery or power supply terminal, but through respective diodes $W$ and $W'$ which are connected across the supply battery in series with resistance $R_{11}$, being poled so as to be conductive and in this manner provide compensation for the knee voltage in the base-to-emitter characteristic of transistors $T_3$ and $T'_3$.

Thus, the impedances seen at the bases of transistors $T_3$ and $T'_3$ in the direction of the frequency selective network are respectively constituted by resistances $R_9$ in parallel with resistance $R_{10}$ for transistor $T_3$ and by resistance $R_7$ for transistor $T'_3$. Thus, for equal effective source impedances $$1/R_7=(1/R_9)+(1/R_{10}) \qquad (35)$$

This means that the value of R previously used for the analysis of the circuit of FIG. 2 is defined by $$\frac{1}{R}=\frac{1}{R_9}+\frac{2}{R_{10}}+\frac{1}{R_{12}}=\frac{1}{R_7}+\frac{1}{R_{12}'}=\frac{1}{R_8} \qquad (36)$$

which implies that the effective collector resistance of transistor $T_2$ is precisely equal to R so that in order to achieve unity gain, this buffer amplifier, using transistor $T_2$ connected in grounded emitter fashion, should have its emitter resistance $R_8$ also equal to R as indicated in the above equation. In the above, the impedance of the equal capacitors $C_5$ and $C'_5$ has been assumed to be negligible with respect to resistances $R_{12}$ and $R'_{12}$.

In this manner, the signals analyzed for the circuit of FIG. 2 are exactly the same as those now to be found at the bases of transistors $T_3$ and $T'_3$ and, since the latter are transistors of opposite conductivity type, summing their collector currents due to the fact that their collectors are commoned and respectively connected to ground and +E power supply terminals through resistances $R_{14}$ and $R'_{14}$, is equivalent with building the difference between the magnitudes of the input signals. Finally, capacitor $C_6$ connected across $R_{14}$ is a smoothing capacitor which removes the carrier ripple from the output signal. It can be the input capacitor of a more elaborate output low pass filter.

FIG. 6 shows the output response as a function of frequency which can be secured by means of the circuit of FIG. 5 for a carrier of center frequency of 1860 Hz. with peak response at 60 Hz. on each side of the center frequency. The response corresponds to that obtained with the circuit of FIG. 2. In the quiescent state, it is obvious that the output live terminal being connected to the commoned collectors of transistors $T_3$ and $T'_3$ will be at a potential $E/2$ in view of the symmetry of the output part of the circuit of FIG. 5. Should an input signal be received at a very low frequency, the magnitude of the impedance constituted by the reactive network will be much higher than the effective resistive network (R) so that transistor $T'_3$ will conduct far more than transistor $T_3$ and accordingly the output voltage will be raised to $E/2+V$. As the frequency increases, a point will eventually be reached, when the impedance of the reactive network will be that of a capacitance and of magnitude equal to R. Then, the voltages will be balanced and transistors $T_3$ and $T'_3$ conducting in equal manner, the output will be at $E/2$. This corresponds to the normalized frequency $u_1$ indicated on FIG. 6 and whose value is defined by the smaller root of equation (10). Thereafter, as the frequency further increases and as indicated by FIG. 6, series resonance will be reached for the reactive network and all the input signal being delivered to transistor $T_3$, a negative peak down to $E/2-V$ will be reached, this corresponding to a value of $1k$ for the normalized frequency $u$, as indicated in FIG. 6. Then, the linear part of the characteristic is reached with zero response, or an output voltage of $E/2$ being again obtained when the magnitude of the now inductive reactive network is precisely equal to R, i.e., $u=1$. Thereafter, the characteristic being skew symmetrical as already explained, it follows in an inverted manner for the frequencies above the center frequency the shape already detailed for those below.

While the principles of the invention have been described above in connection with specific apparatus, it is to be clearly understood that this description is made only by way of example and not as a limitation to the scope of the invention as set forth in the objects thereof and the accompanying claims.

We claim:

1. An angle modulation detector comprising:
a source of input signals;
a frequency selective network coupled to said source including:
two-terminal reactive and resistive network exhibiting two reversals of sign at two predetermined frequencies corresponding to opposite peaks in the output signal of said detector at said predetermined frequencies;
two output detecting circuits coupled to said frequency network to produce said output signal; and
an amplifier having a relatively high input impedance;
said reactive and resistive networks being connected in series across said source;
the input of said amplifier being coupled across said reactive network;

one of said detecting circuits being coupled to the output of said amplifier; and the other of said detecting circuits being coupled across said resistive network.

2. A detector according to claim 1, further including a power supply having two terminals; and wherein said one of said detecting circuits includes a first transistor of one conductivity type; and said other of said detecting circuits includes a second transistor of a conductivity type opposite said one conductivity type;

said first and second transistors having their emitter-to-collector circuits coupled in series across the terminals of said power supply with the collector of said first transistor being directly connected to the collector of said second transistor;

said output signal being obtained at said collectors of said first and second transistors;

the base-to-emitter circuit of said first transistor being coupled across the output of said amplifier; and the base-to-emitter circuit of said second transistor being coupled across said resistive network.

3. A detector according to claim 2, wherein said amplifier includes a third transistor having a conductivity type the same as the conductivity type of said second transistor;

said reactive network being resistively coupled across the base-to-emitter circuit of said third transistor.

4. A detector according to claim 3, wherein the base of said third transistor is directly connected to one terminal of said reactive network and biased by a first resistor coupled between the base of said third transistor and one terminal of said power supply, the resistance of said first resistor being equal to the collector load resistance of said third transistor; and a second resistor couples the emitter of said third transistor to the other terminal of said reactive network, said second resistor having a resistance equal to the resistance of said first resistor.

5. A detector according to claim 2, wherein a first resistor is coupled to the base of said first transistor;

a second resistor is coupled to the base of said second transistor;

a first diode poled in a given direction is coupled between said first resistor and one terminal of said power supply;

a second diode poled in a direction opposite said given direction is coupled between said second resistor and the other terminal of said power supply; and a third resistor coupled between the opposite electrodes of said first and second diodes.

said output signal is obtained between said collectors of said first and second transistors and one of the terminals of said power supply.

6. A detector according to claim 2, wherein said source includes an emitter-follower having a third transistor of conductivity type the same as said second transistor.

7. A detector according to claim 5, wherein the resistance of said resistive network is substantially equal to the impedance of said reactive network at a frequency which is the geometric means of said predetermined frequencies.